United States Patent
Ekstrom

[15] 3,670,236
[45] June 13, 1972

[54] CONVERTER STATION HAVING PARALLEL-CONNECTED STATIC CONVERTERS

[72] Inventor: Ake Ekstrom, Ludvika, Sweden
[73] Assignee: Allmanna Svensak Elektriska Aktiebolaget, Vasteras, Sweden
[22] Filed: Jan. 25, 1971
[21] Appl. No.: 109,433

[30] Foreign Application Priority Data
Jan. 27, 1970 Sweden..........................967

[52] U.S. Cl. ..........................................321/27 R
[51] Int. Cl. ................................................H02m 7/00
[58] Field of Search..........................307/58; 321/27

[56] References Cited

UNITED STATES PATENTS

| | | | |
|---|---|---|---|
| 2,243,572 | 5/1941 | Moyer et al. | 321/27 R |
| 2,246,181 | 6/1941 | Morton | 321/27 R X |
| 1,714,656 | 5/1929 | Burgess et al. | 307/58 |
| 2,891,212 | 6/1959 | Bingham | 321/27 R |
| 3,303,349 | 2/1967 | Sinclair et al. | 307/58 |
| 3,447,063 | 5/1969 | Hammarlund | 321/27 R X |
| 3,526,780 | 9/1970 | Uhlmann et al. | 307/82 |
| 3,549,977 | 12/1970 | Watkins | 307/58 X |

FOREIGN PATENTS OR APPLICATIONS

| | | | |
|---|---|---|---|
| 860,828 | 2/1961 | Great Britain | 321/27 |

*Primary Examiner*—William M. Shoop, Jr.
*Attorney*—Jennings Bailey, Jr.

[57] ABSTRACT

A converter station for high voltage direct current includes two substantially identical parallel converter branches provided with control systems therefore which limit the control angles of the converters of the branches upwards or downwards. A balancing arrangement is provided to assure equal current distribution between the two converter branches when they are forced so far in one direction that the limit value emitter for the converters of one of the converter branches becomes active. The balancing arrangement includes a device responsive to the difference between the current in the two branches to regulate the control system of the converter of the other branch. This arrangement may include cross connections between the limit value emitters to control converters of both converter branches.

3 Claims, 4 Drawing Figures

INVENTOR.
ÅKE EKSTRÖM
BY
Jennings Bailey

CONVERTER STATION HAVING PARALLEL-CONNECTED STATIC CONVERTERS

BACKGROUND OF THE INVENTION

1. Field of the Invention

The present invention relates to a converter station having parallel-connected static converters connected to a high voltage DC power transmission line and the invention relates to achieving uniform current distribution between the parallel converters.

2. The Prior Art

The first power transmission lines built for high voltage direct current using static converters were intended only for power transmission between two points and comprised a rectifier station and an inverter station which were connected in series over the DC power transmission line. Control was carried out according to the so-called current marginal principle, that is, the current regulator in the rectifier station was set with a higher desired value than the corresponding current regulator in the inverter station. The difference between the desired values set is called the marginal current and the station having the greatest voltage resources on the AC side will adopt the current set, while the other station will be forced on the current from the former after it has increased its inner direct voltage to the maximum value in one or the other direction. The latter station will in this way determine the direct voltage of the transmission line.

In DC power transmission lines having more than two stations, these are suitably connected in parallel between two poles of the transmission line, one of which may be earth, and the current regulators of the stations are set with such desired values that the sum of the desired values of all the rectifier stations exceeds the sum of the desired values of all the inverter stations with a marginal current. The result is that all stations except one — that with the weakest voltage resources — tend towards their set current, whereas the weakest station is forced to a current which deviates from that set by an amount equal to the marginal current.

SUMMARY OF THE INVENTION

The present invention relates to a converter station having parallel-connected static converters, for example having two parallel-connected converter branches. The object of designing a station in this way may in the first place be to satisfy the demand for power in the station. If, for example, a transmission system is imagined in which one station has twice as great a power requirement as the other, the same type of rectifiers and possibly even transformers and other components may be used simply by doubling the number of components in the first station in relation to the second. If no special precautions are taken, both the parallel converter branches will act as two independent stations. Since these two branches are nominally equivalent, it is also desirable that they should operate under similar conditions and have the same load and current. This is all right if the voltage sources of the station are so strong in relation to other stations that the two parallel branches can be separately guided to the desired current strength, equal to half the current strength of the station.

If, on the other hand, the station in question is the one having the lowest voltage resources within the system, all other stations will as mentioned adopt the correct current strength whereas the resultant current in the station in question will deviate from that set by an amount which is equal to the marginal current. When this current is distributed between the two branches of the station, however, any differences between these will be noticed and since, in practice, the two branches can never be exactly alike, one of them will adjust itself to the desired current strength and the other will have to take up the marginal current alone. For this reason the currents in the two branches differ by an amount equal to the marginal current.

In order to avoid this it is proposed according to the invention to arrange a balancing means in the station to achieve equal current distribution between the two converter branches when they are approaching the upper or lower limit of the delay angle. This balancing means comprises members by means of which the control system in one branch influences the control system in the other branch according to a difference in a certain operating magnitude in the two branches.

BRIEF DESCRIPTION OF THE DRAWINGS

The invention will be further described with reference to the accompanying drawings in which.

DESCRIPTION OF THE PREFERRED EMBODIMENTS

Figure 1:
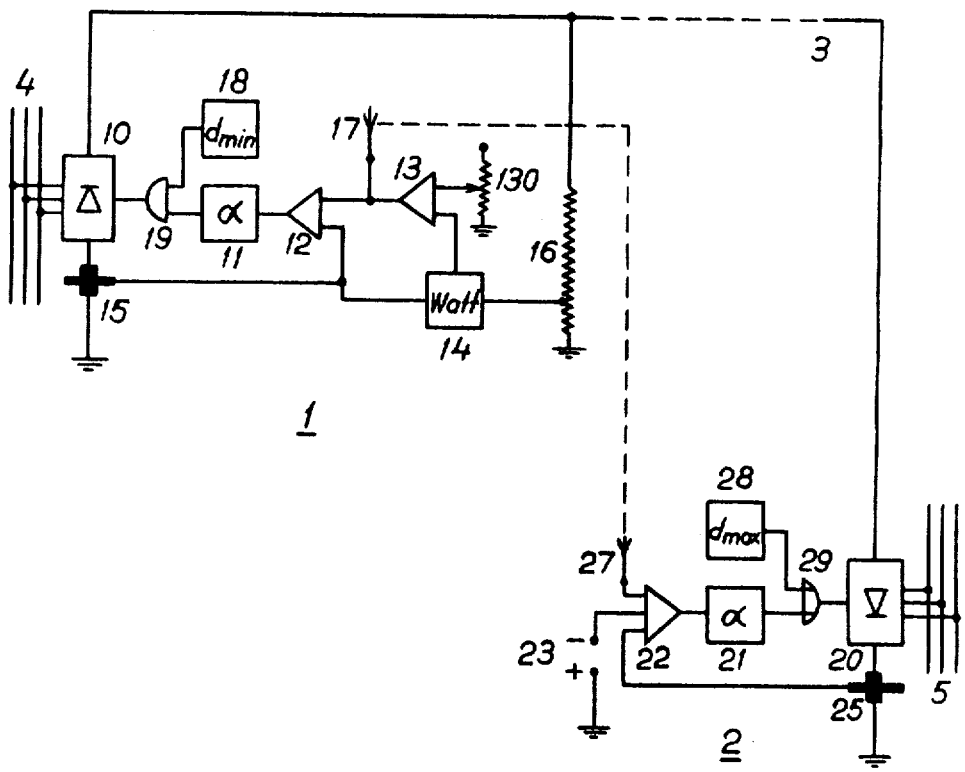
FIG. 1 shows a conventional DC power transmission line having two stations, that is, one rectifier and one inverter station.

FIG. 1 shows a conventional DC power transmission line comprising a rectifier station 1 and an inverter station 2 jointed by a DC line 3 and earth, and connected to AC networks 4, 5, respectively. Each station comprises a static converter 10, 20, respectively, consisting of a converter-transformer and a rectifier bridge. The rectifiers of the rectifier bridge are controlled by a control pulse generator 11, 21, with a delay angle $\alpha$ determined by the signal from a control amplifier 12, 22, respectively. The control pulse generators 11 and 21 may, for example, be constructed in accordance with U.S. Pat. No. 3,551,778. The control amplifiers 12 and 22 are current regulators, the real-value inputs of which are connected to a measuring transductor 15, 25, respectively, while the desired-value inputs are connected to a main regulator 13 for the whole transmission line.

In the case shown the transmission is controlled with respect to the power transmitted, the desired value of which is set on a potentiometer 130 while its real value is measured by a wattmeter 14 connected to the measuring transductor 15 and a voltage-divider 16 connected to the DC transmission line 3. The main regulator 13 will thus emit a signal with respect to a certain desired value of the power transmitted, which signal is connected directly to the current regulator 12 of the rectifier station and is transmitted over a telecommunication system, symbolized by the antennae 17 and 27, to the current regulator 22 of the inverter station.

A voltage source 23 is also connected to the input of this current regulator, with the help of which a marginal current is set in the inverter station.

The direct current transmitted is determined by the equation:

$$I = (E_L + E_1/R)$$

where $E_L$ is the internal direct voltage of the rectifier station and is equal to $k \cdot E_4 \cdot \cos \alpha_1$, whereas the internal direct voltage of the inverter station, $E_1 = k \cdot E_5 \cdot \cos \alpha_2$. $E_4$ and $E_5$ indicate the voltage in the AC networks 4 and 5, respectively, whereas $\alpha_1$ and $\alpha_2$ indicate the delay angles for the two stations.

In such a transmission line controlled according to the marginal current principle the regulators 12 and 22 in the two stations will decrease and increase the delay angles of the stations, respectively, in order to carry out individually the current order set. However, this is different in the two stations because of the marginal current set, and the station therefore prevails which has the greatest voltage resources on the AC side. The station having smaller voltage resources continues to the limit of its delay angle, thus dictating the line voltage, whereas the other station increases its direct voltage until the current according to the above equation corresponds to the current set so that this latter station determines the current transmitted.

As is previously known, for instance from the above-mentioned U.S. Pat. No. 3,551,778, there must be a means in the inverter station to ensure an upper limit $\alpha_{max}$ of the delay angle corresponding to a certain smallest commutation margin. This means 28 may be designed in accordance with U.S. Pat. No. 2,774,012 and connected in parallel with the normal control pulse generator 21 over an Or-gate 29.

In the same way there should be a means 18 in the rectifier station to limit the delay angle downwardly. This means is connected in parallel with the control pulse generator 11 over an And-gate 19.

If it is now imagined that in one of the stations 1 or 2, or possibly in both, the converters are doubled by parallel-connection of two converters, two such parallel converters will behave as two independent stations so that a power transmission is obtained with several stations connected in parallel, in approximately the same way as in U.S. Pat. No. 3,526,780. It is also possible for one station in such a multi-station transmission line to consist of two parallel branches, for example as indicated in FIG. 2.

Figure 2:
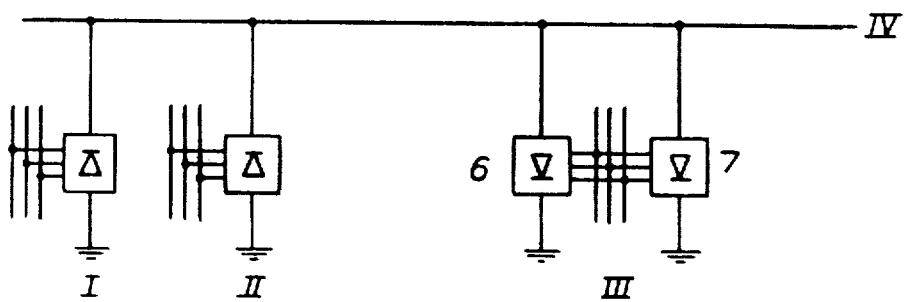
FIG. 2 shows a power transmission line with a converter station according to the invention comprising two parallel branches.

FIG. 2 shows three converter stations I, II, III connected in parallel to a DC line IV, the voltage of which is determined by the station which has the lowest voltage resources on the AC side, as mentioned in U.S. Pat. No. 3,526,780.

Figure 4:
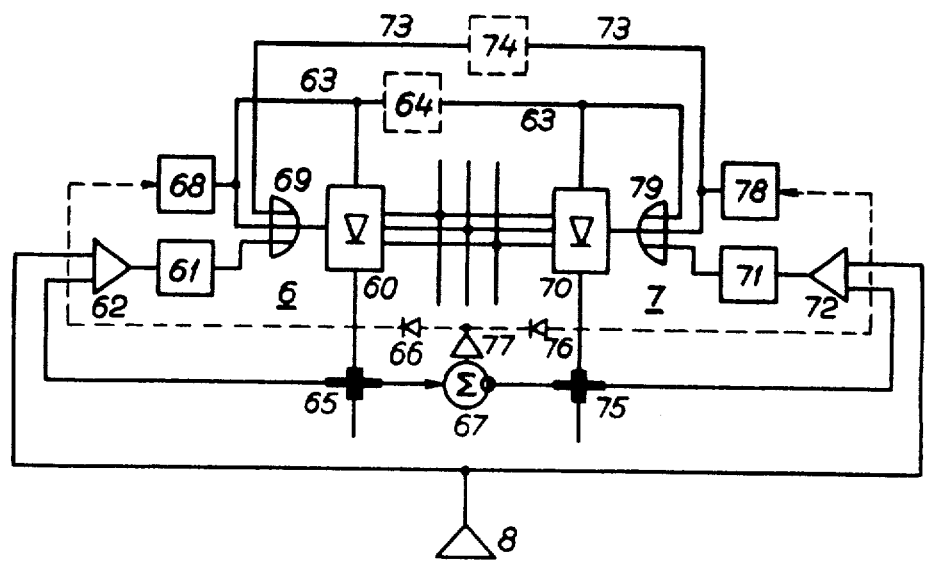
FIG. 4 shows the converter station according to the invention in a more detailed embodiment.

The station III, which is shown in more detail in FIG. 4, comprises two parallel converter branches 6 and 7 which in the drawing consist of only one converter each but which in practice may each comprise two or more converters connected in series. The two converters have individual control pulse generators 61,71, controlled from current regulators 62,72, respectively. The two current regulators are controlled with the same desired-value from a main regulator 8 corresponding to the main regulator 13 in FIG. 1. On the other hand, they should have individual real-value emitters in the form of measuring transductors 65,75 in order to obtain the actual current in each of the two converters so that these are directed towards the correct current, that is, equivalent currents equal to half the resultant current of the station.

If the station has sufficient voltage resources to determine its own current, the two converter branches will automatically adjust their delay angles and thus their internal direct voltage in relation to the line voltage so that each branch takes up exactly half the current, apart from unavoidable tolerance differences between the two branches. If, on the other hand, the station in question is that having the lowest voltage resources and is thus the one determining the line voltage the situation will be different, because of the above-mentioned unavoidable differences between the stations.

Figure 3:
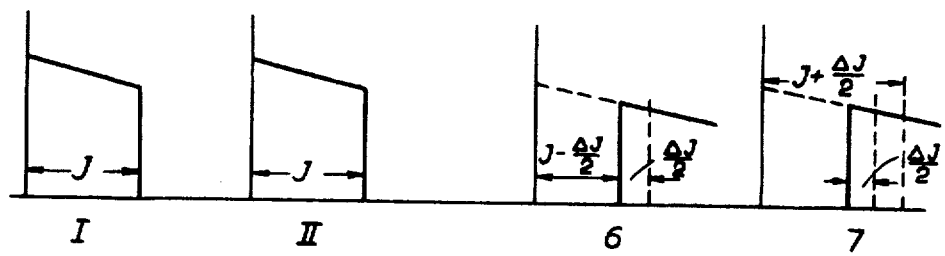
FIG. 3 shows current-voltage characteristics for this station.

It may be imagined that the station III is an inverter station which is fed by two rectifier stations I and II, the stations thus having current-voltage characteristics according to FIG. 3 corresponding to the characteristics in the above mentioned U.S. Pat. No. 3,526,780.

The converters 6 and 7 have nominally similar characteristics since they are nominally alike, are connected to the same AC and DC networks and have the same desired-value emitter 8 for the current regulators 62,72. For the sake of simplicity it is assumed that the stations I and II are also alike, which is reasonable in practice, since the same type of converter can then be used throughout the plant. The rectifier stations I and II are therefore each set for a current I, whereas the inverters 6 and 7 which should have the same current and therefore divide the marginal current $\Delta I$, are each set with a desired value $I - \frac{1}{2} \cdot \Delta I$.

If 6 and 7 were exactly alike in all respects, it might be thought that both would tend towards the least commutation margin and be forced on to the current I which exceeds the desired value by $\frac{1}{2} \cdot \Delta I$. However, such can never be the case since this is a labile operating condition because of the negative inclination of the voltage-current characteristic when directing towards the smallest commutation margin. One converter, for example 6, will therefore tend towards the set current $I - \frac{1}{2} \Delta I$, whereas the other one, 7, is forced to the current $I + \frac{1}{2} \cdot \Delta I$ and thus has to take up the entire marginal current. In order to rectify this there are several ways possible according to the invention, as shown in the drawings.

As show in FIG. 4 the commutation margin control devices 68,78 may be connected in parallel with the normal control pulse generators 61,71, respectively, by means of Or-gates 69,79, and these Or-gates are provided with a third input which is cross-connected to one of the commutation margin control devices by means of extra connections 63,73. In this way, the commutation margin control device which first emits its pulse will emit pulses to both the converters, which will therefore commutate simultaneously. The mentioned control device is the one belonging to the converter having the lowest alternating voltage and the other converter is thus forced to commutate simultaneously so that it cannot increase its control angle and thus its internal direct voltage indefinitely.

This need not mean that the currents are exactly equal in both the converters since equal delay angles need not cause the same direct voltage and furthermore, the internal resistances are not necessarily alike in the two branches. However, the difference between the currents will be considerably less than the marginal current, assuming that the difference between the dimensions and characteristics of the branches remain within reasonable limits.

Simultaneous firing presupposes the same phase position of the two converters. If they have different phase positions, either because of slight differences in the converter transformers or because these are connected differently to achieve a doubling of the pulse number in relation to the converters, the corresponding phase-shifting must be introduced in the conductors 63 and 73 in FIG. 4, as indicated by the phase-shifting devices 64,74.

Another way of achieving uniform current distribution between the converter branches is to take out the difference between the currents measured by the transductors 65 and 75 with the help of a summation device 67, the two currents being connected with opposite signs and this difference being connected to an extra input on the commutation margin control devices 68 and 78. These control devices are modified so that a signal being fed in with one polarity increases the desired value of the commutation margin, while a signal of the opposite polarity does not affect this reference value. This means, for example, that if the converter 7 should tend to take over too large a proportion of the common current a negative signal, for example, will be obtained from the member 67. This leads to an increase of the desired value of the commutation margin in the control device 68 and thus a decrease in the delay angle and decreased voltage over the converter 6. The control device 78 remains unaffected by this signal, as well as the converter 7. The altered voltage between the converters 6 and 7 now re-establishes the balance in the current and if an amplifier 77 is connected in the output from 67, substantially entirely uniform current distribution can be achieved between the converters, that is, better uniformity than with the first solution. This embodiment also permits a different current distribution between the branches which is not absolutely uniform, in that the signals to the member 67 are introduced with different constants. The diodes 66 and 76 are shown to indicate that the devices 68 and 78 are activated by signals of different polarity.

In the above example it is presumed that the station III was operating as an inverter. If this is operating as a rectifier under the same conditions, that is, with smaller voltage resources than the other stations of the transmission line, similar problems may occur with the current distribution.

In this case the devices 68 and 78 limit the delay angle downwardly and the gates 69 and 79 must therefore be designed as And-gates, as is clear from the U.S. Pat. No. 3,551,778.

In this case the current balance is suitably selected by means of the members 67 and 77, and the converter which has the largest voltage resources and therefore tends to increase its current will have an increased value of the minimum delay angle set in the device 68,78, respectively, and thus lowered voltage so that balance is achieved.

If the converter station has more than two parallel branches, the problem of balance can be solved as above. The only difference is that there are more cross-connections or balancing signals and the resultant complications set a limit for how many parallel branches it is reasonable to arrange in practice.

I claim:

1. Converter station (III) for high voltage direct current comprising at least first and second parallel converter branches having substantially the same dimensions and properties and provided with control systems comprising individual limit value emitters to limit the control angles of the converters of said branches upwards or downwards, in which the station is provided with a balancing means to achieve equal current distribution between the two converter branches when these are forced so far in one direction that the limit value emitter for the converters of at least the first of the converter branches becomes active, said balancing means including cross-connection means between the limit value emitters of the two branches responsive to a condition in which one of the limit value emitters becomes active before the other to control the converters of both converter branches from the first active limit value emitter.

2. Converter station according to claim 1, in which the two converter branches have different phase positions in relation to a common alternating current network, and in which said cross-connection means comprise phase shifting devices corresponding to the phase angle between the two branches.

3. Converter station (III) for high voltage direct current comprising at least first and second parallel converter branches having substantially the same dimensions and properties and provided with control systems comprising individual limit value emitters to limit the control angles of the converters of said branches upwards or downwards, in which the station is provided with balancing means to achieve equal current distribution between the two converter branches when these are forced so far in one direction that the limit value emitter for the converters of at least the first of the converter branches becomes active, said balancing means comprising a comparison member which derives the difference between the currents in the two branches and means responsive to the polarity of this difference to give a signal to one of the limit value emitters to increase its set limit value, leaving the limit value emitter in the other station unaffected.

* * * * *